United States Patent [19]

Bourigault

[11] 4,186,605

[45] Feb. 5, 1980

[54] SET OF THERMOCOUPLES FOR MEASURING THE AVERAGE OF SEVERAL TEMPERATURES IN A GIVEN SPACE

[75] Inventor: Raymond Bourigault, Le Pecq, France

[73] Assignee: Materiel et Auxiliaire de Signalisation et de Controle pour l'Automation, Auxitrol, France

[21] Appl. No.: 879,278

[22] Filed: Feb. 21, 1978

[30] Foreign Application Priority Data

Feb. 25, 1977 [FR] France .............................. 77 05557

[51] Int. Cl.² .............................................. G01K 7/02
[52] U.S. Cl. ................................................... 73/341
[58] Field of Search ................... 73/341, 362.4, 362.5, 73/708

[56] References Cited

U.S. PATENT DOCUMENTS

| | | | |
|---|---|---|---|
| 1,659,804 | 2/1928 | Brown | 73/341 |
| 1,985,967 | 1/1935 | Wunsch | 73/341 |
| 2,996,916 | 8/1961 | Smith | 73/341 |
| 3,053,091 | 9/1962 | Braunagel | 73/341 |

Primary Examiner—Donald O. Woodiel
Attorney, Agent, or Firm—Alan H. Levine

[57] ABSTRACT

A set of thermocouples for measuring the average of several temperatures in a given space the thermocouples being connected in parallel by connecting wires of the same materials as the thermocouples proper. These connecting wires are constituted by portions having sections chosen according to the location of the thermocouples to which they lead in order that the total electrical resistance between a thermocouple and the measurement point is substantially identical to the resistance between each of the other thermocouples and the measurement point. The set of thermocouples can be used for measuring the temperature of the exhaust gases of turbines.

5 Claims, 7 Drawing Figures

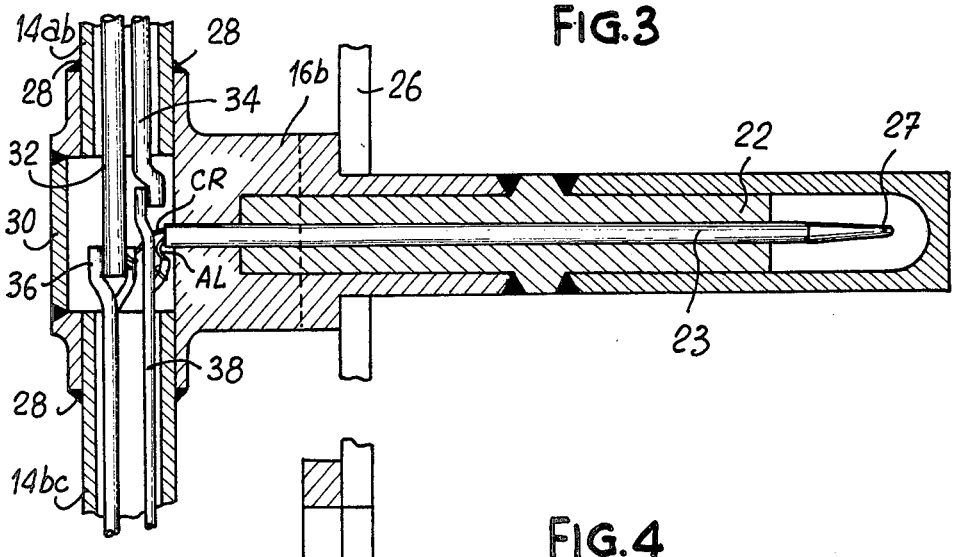
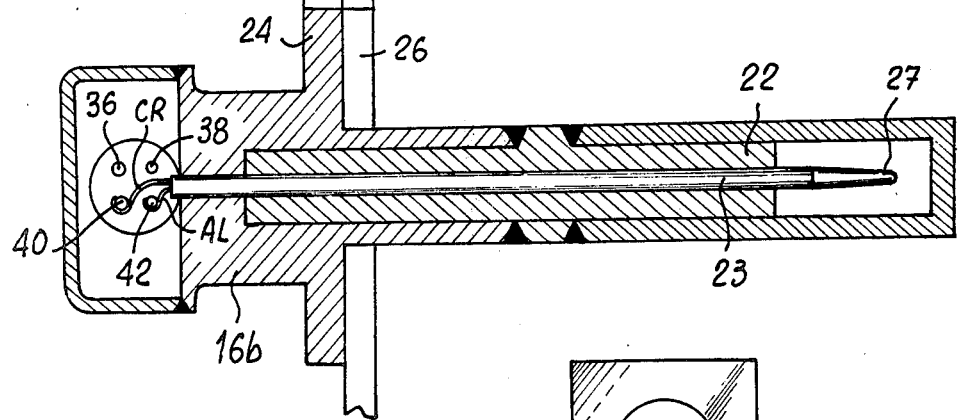
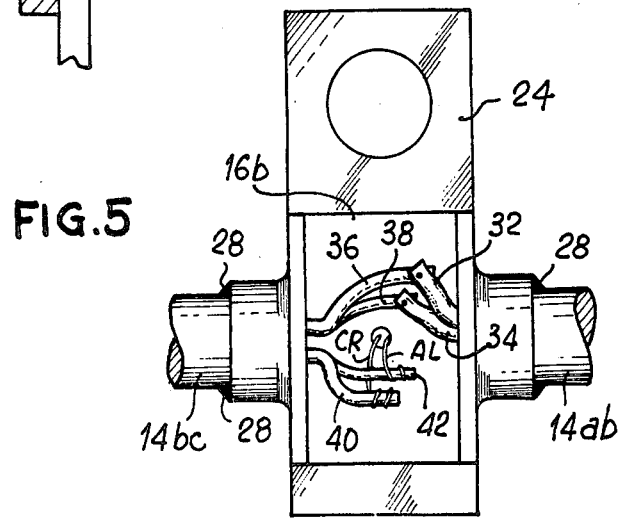

SET OF THERMOCOUPLES FOR MEASURING THE AVERAGE OF SEVERAL TEMPERATURES IN A GIVEN SPACE

The present invention relates to a system for measuring temperatures by means of thermocouples.

This system is particularly suited to the problem of measuring the temperature of the exhaust gases of aircraft turbo-jets. In fact, these temperatures must be determined precisely in order to monitor the correct operation of jet engines. It is advisable that the gases are hot in order to increase the thrust and efficiency of the engine, but it is necessary that the temperature of the latter remains below a value at which they become too dangerous to be tolerated without damage to the various parts of the engine in particular the stationary and moving blades of the turbines.

At present, the means temperature is measured in the high speed gas ring formed at the outlet of the turbines by sets of thermocouples distributed in a circle in the ring and which are connected in parallel in order that the common voltage at the connecting point of all the thermocouples essentially represents a measurement of the average of the temperature in the gas ring.

Depending on the types of engine, the locations of the temperatures inside the engine casing in the region of the outlet of the turbines are known approximately and probes containing one or more thermocouples are consequently placed at desired positions, more particularly at the height of the hot points of the estimated locations. The number of probes is generally between two and twelve, depending on the desired accuracy and the admissible cost price for each particular case.

The connections of thermocouples in parallel facilitate a measurement of the mean temperature in the hot part of the gas ring, but with an error which is due to the fact that the connections connecting the thermocouples to a common measurement point have different resistances from one to another and in addition vary considerably with the ambient temperature prevailing around these connections.

By way of example, one seeks to measure the temperatures of hot points of the gas ring of approximately 950° C., which may vary by ±50° C. This latter variation has a considerable influence on the resistance of the connections, since the latter are normally made from the same materials as the thermocouple proper, under the circumstances the latter may be chromel and alumel, which are materials whose resistivity varies considerably with the temperature.

Two phenomena combining to produce a loss of the measuring accuracy of the mean temperature are thus superimposed when the thermocouples are connected in parallel.

On the one hand, the electro-motive forces produced by the thermocouples in parallel can be averaged arithmetically only where the resistances of their connections are equal, which is not generally the case in view of the different lengths of connections due to the different geographic positions of the thermocouples with respect to the point where the resultant electro-motive force is measured.

On the other hand, temperature variations in the region of the connections necessarily produce variations in the resistance of the latter. In fact, it is not possible to use highly conductive connections such as copper wire, since it is indispensable that the connections are made from the same materials as the thermocouple (most frequently chromel and alumel) in order that additional electro-motive forces are not created by welds at different temperatures, between different materials, which would form parasite thermocouples which are difficult to control.

To eliminate this drawback, various schemes for connecting the thermocouples in parallel have been proposed, with compensation resistances which to a certain extent reduce the averaging errors with respect to the errors existing in the absence of these resistances.

The main schemes adopted are as follows:

(1) Parallel connection of each thermocouple on a two-core cable joining all the probes, with a compensation resistance inserted between the cable and one of the wires of the thermocouple (FIG. 1a); the thermocouples are shown as being aligned but they may be arranged in a circle for example for measuring the temperature of an exhaust gas ring. The compensation resistance is chosen to be the greater the closer the thermocouple to the point for measuring the averaged potential difference, such that the total resistance of each thermocouple seen from the measuring point, i.e., with its connection and compensation resistance, is identical for all the thermocouples.

(2) Connection of each thermocouple directly to the measurement point by two-core cables extending from each of the thermocouples to the measurement point and with a compensation resistance inserted between a wire of the thermocouple and one strand of the two-core cable which corresponds to the latter (FIG. 1b).

(3) Parallel connection of the thermocouples in pairs (or in threes) and interconnection of the junction points of the groups of two or three, etc., then connection of the arrangement to the measurement points. Compensation resistances may be inserted between one of the wires of the thermocouple and its connection to another thermocouple, as well as in one of the connecting wires between one group of thermocouples and another (FIG. 1c).

The applicant has found that these various arrangements did not completely eliminate the averaging errors mentioned above. Statistical calculations and measurements, taking into account the uncertain distribution of temperatures in the ranges afore-mentioned, both as regards the thermocouples and the connection wires which interconnect the latter, have shown that the connections of the prior art provided an averaging error of several tenths of a degree to several degrees.

The present invention intends to improve the accuracy of measurement of the mean temperature and for this, it is proposed to provide a scheme for connecting the thermocouples in parallel, in which compensation resistances are constituted by an appropriate choice of sections of each of the connecting wires of the two-core cables interconnecting the thermocouples or connecting them to a point for measuring voltage. For example, if the thermocouples are constituted by welding together a chromel wire and an alumel wire, the wires for connecting the thermocouples in parallel will also be made from chromel and alumel and the section of each of the portions of connecting wire will be chosen, taking into account their length and resistivity, in order to provide a common total resistivity considered from the measuring point to the connections to each of the thermocouples.

Thus, the compensation resistance is distributed in each of the connection wires (chromel and alumel) and over the entire length of these wires and statistical calculations and measurements have shown that the accuracy of the average value measured is better than with arrangements known at present.

Since the connection wires have resistances varying with the temperature according to different coefficients for each of the materials, when calculating the sections of these wires, it will be contrived to give the same linear resistance to two wires of the same portion for the approximate temperature estimated for the ambient region where they will be located. It can also be envisaged to give two wires of the same portion different linear resistances, but such that the variations in the resistance of the two wires with temperature are substantially identical despite the different coefficients of variations in resistance of the two wires.

Since the ambient temperature prevailing in the region of the connections is high, the connection wires are protected by inserting them in a tube of metal which withstands high temperatures (for example inconel), this tube being packed with highly compacted magnesia to ensure the insulation of these wires at the operating temperature.

After having calculated the necessary sections of the portions of wire between thermocouples, taking into account the spacing of the thermocouples of the set, the practical production of sets of thermocouples consists of manufacturing screen multi-core cables having a mineral insulation (compacted magnesia for example, or alumina, zirconium or the like) whose leads (in general two, four or six) have the desired diameters, then of soldering together portions of the cables produced in this way in order to form the set of thermocouples (welding of the wires to each other or to the thermocouples themselves and welding of the protective tubes to each other or to the casing of the probes containing the thermocouples.)

The screened multi-core cables comprising mineral insulation may also be terminated by connectors in the same way as the probes comprising thermocouples in order to produce sets whose probes are more easily interchangeable.

Further features and advantages of the invention will become apparent on reading the detailed description referring to the accompanying drawings in which:

FIGS. 1a, 1b, 1c show the schemes for the parallel connection of the thermocouples of the prior art, FIG. 2 shows a scheme for a circular arrangement of a set of thermocouples according to the invention, FIG. 3 is a detailed view of a probe with a casing for connection to portions of screened cable extending to a common point for the measurement of the average of the electro-motive forces of the thermocouples of the set, FIG. 4 is a lateral sectional view of the probe of FIG. 3, FIG. 5 is a plan view of the probe of FIGS. 3 and 4, with the casing open.

Figure 1A:
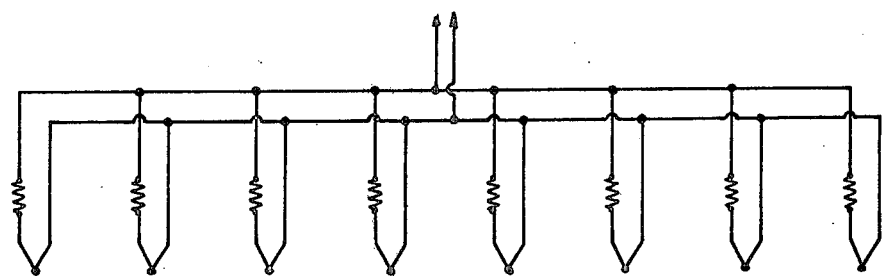
FIGS. 1a to 1c show the prior art for connecting thermocouples in parallel. They have been described previously.
Figure 1B:
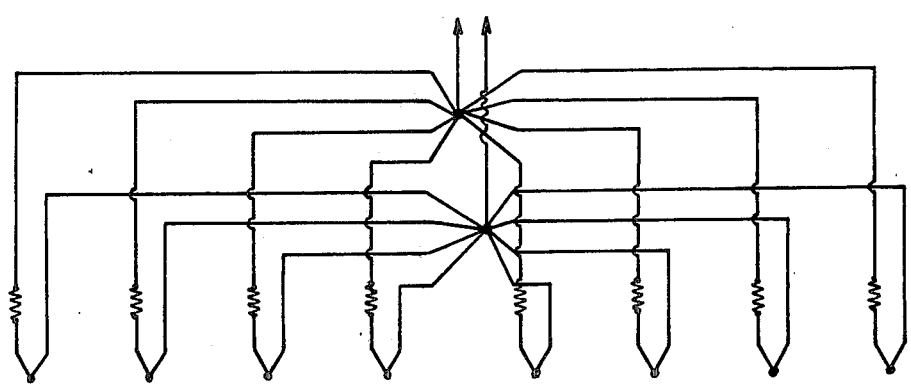
Figure 1C:
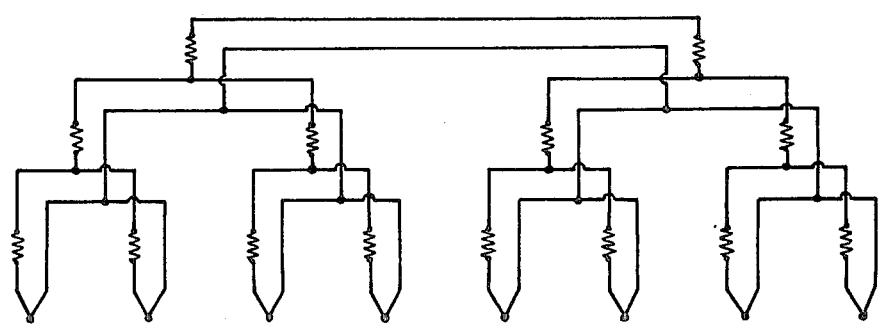
Figure 2:
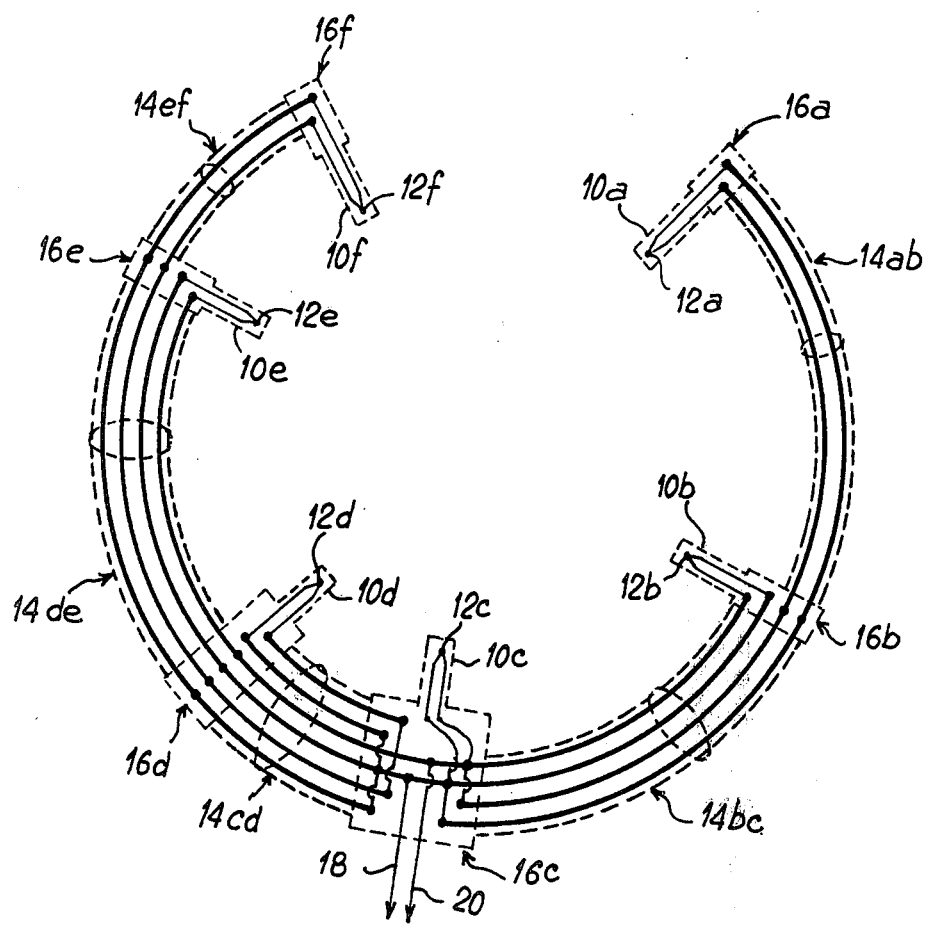
FIG. 2 shows the connection according to the invention, more particularly in the case of measuring temperatures in an exhaust gas ring of an aircraft turbo-jet, it being understood that other applications may be envisaged.

For the purpose of this measurement, probes 10a, 10b, 10c etc. containing thermocouples 12a, 12b, 12c, etc., are distributed around a casing for the escape of gases, not shown in FIG. 2 and penetrate the inside of this casing in order that the hot welds of the thermocouples are located at the desired level in the gas ring.

In the example illustrated, six probes are provided, each containing a thermocouple which is constituted by a fine chromel wire and a fine alumel wire welded together at their ends. Probes comprising several thermocouples whose hot welds are adjacent or located at different points along the length of the probe and of materials other than chromel and alumel may naturally be used.

As has been explained, it is desirable to connect the thermocouples in parallel, by connections made of the same materials as the thermocouples, i.e., by chromel wires for connecting the strands of chromel of each of the thermocouples and by alumel wires for connecting the strands of alumel of each of the thermocouples.

The connections pass outside the casing containing the gases at high temperature. However, they are located in an ambient medium at a temperature of approximately 150° C. (for example) and they must thus be protected. To this end, they are contained in protective tubes shown diagrammatically in FIG. 2: a tube 14ab connects the probes 10a and 10b, a tube 14bc connects the probes 10b and 10c, etc.

These tubes are made from materials which withstand high temperatures, for example inconel (iron and nickel alloy having good flow qualities at high temperature). They are welded to connecting casings of the same material which are themselves welded to the probes comprising thermocouples for producing a sealed casing around all the chromel and alumel wires of the set, both along their trajectory as well as in the region of their interconnections.

The casings shown diagrammatically in FIG. 2 are designated by the reference numerals 16a, 16b, 16c etc.

In the example shown in FIG. 2, the connection casing 16c also serves as a junction box common to all the thermocouples for connection to a circuit for measuring voltage which is not shown. Two measurement wires leave the junction box 16c, which wires are connected to all the thermocouples in parallel, on which wires the mean electro-motive force generated by all the thermocouples is measured, in order to deduce the mean temperature in the gas ring in the region of the welds of the thermocouples.

In the parallel connection shown in FIG. 2, each of the thermocouples is connected to the connection box 16c (and to the measurement point 18, 20), by a two-core cable such that the portions of tube 14ab, 14bc, etc., contain different numbers of connecting wires from one to another.

The portions 14ab and 14ef contain only the wires leading to the thermocouples 10a and 10f, the portions 14bc and 14de contain the wires leading both to the thermocouples 10a and 10f as well as to the thermocouples 10b and 10c; the portion 14cd contains six wires, leading to three thermocouples 10d, 10e and 10f.

The portions of tube containing a variable number of wires (2, 4, or 6 or more if there are more thermocouples) are manufactured before being welded to each other and to the casings for connection to the probes.

These portions are screened multi-core cables comprising mineral insulation (in order to withstand high ambient temperatures). They are constituted by chromel and alumel wires embedded in the highly compacted magnesia which completely fills the protection tube.

They are manufactured in the following manner: beads of pre-calcined magnesia are threaded on each of the wires of the cable to be produced, the arrangement is then slid into a tube of inconel, the arrangement is hammered, which causes the magnesia to return to powder form and compacts the latter considerably thus filling all the gaps. The protected cables are cut into portions of the desired length.

According to a very important feature of the invention, one ensures that the electrical resistance of the connecting wires between the measurement point (wires 18, 20) and a thermocouple is the same for all the thermocouples, by giving the connecting wires contained in the various portions of tube various sections calculated in order to achieve this equality.

FIG. 2 shows that the distances are longer between the measurement point and the thermocouples 10a and 10f than between the measurement point and the thermocouples 10b and 10c or 10c and 10d. The connection wires will be larger for longer distances, i.e., for connections to thermocouples further away from the measurement point.

The calculation of the sections is very simple taking into account the lengths of the distances which are known for a given application: the sections are inversely proportional to the lengths. The lengths are fixed by the geometric shape of the set and by the positions of the thermocouples along the set: if the set has a circular shape, the lengths are those of arcs of a circle between the thermocouples.

It may be preferred for the two-core connections not to have constant sections over their entire length between a thermocouple and the measurement point, but to have constant sections, portion by portion since it is multi-core portions of tube which are welded to each other.

Thus, the chromel wire and the alumel wire connecting the measurement point to the thermocouple 12a could have a first section in the portion 14ab and a second section in the portion 14bc. This provides a latitude in the calculation of the sections of the various wires since one has additional variables.

This may make it possible to produce certain portions all with identical sections of wire (at least for the wires of the same material), which facilitates the manufacture of multi-core cables comprising mineral insulation which constitute the portions. The choice of the different sections of wire is made for each portion of screened tube both for chromel wires and for alumel wires, so that there is a compensation of the resistances on each of the connecting wires and not on only one.

It may also be preferable that each of the wires (chromel and alumel) of a given two-core connection has the same resistance such that the compensation is also distributed over the two wires. This overall resistance which is substantially identical for the two wires should be calculated at the mean temperature estimated for the ambient medium in which the wires are located. Since the distances over which the two wires (chromel and alumel) of one portion extend, are the same, it will thus be arranged that the linear resistances of the two wires are the same at the mean ambient temperature.

At this mean temperature, it is also possible for these two wires to have overall resistances which are not identical but in inverse ratio to the coefficients of variation of resistance with temperature of the two materials, in order that the effect of the temperature variations is distributed equally over the two connecting wires.

FIGS. 3, 4 and 5 show a particular probe of the set according to the invention, not in very great detail, solely by way of example, for example the probe 10b of FIG. 2, with its thermocouple 12b its connecting casing 16b and the portions of screened connecting cable 14ab which leave this casing.

The probe is constituted by a body 22 in which the thermocouple proper is fixed, which is constituted by a chromel wire CR and an alumel wire AL welded at their ends and housed in a protective sheath 23 of inconel. The weld is placed at the bottom of the sheath 23, at its closed end.

The body 22 is welded to a connecting and support casing 16b, which makes it possible to secure the probe to the wall 26 of an outlet housing for the turbo-jet, the housing being provided with an opening for the passage of the probe body, such that the end of the thermocouple penetrates inside the housing.

The end 27 of the thermocouple, containing the weld of the chromel wire and the alumel wire, is thus positioned at a desired point in the gas ring whose temperature one wishes to study. This point is a hot point of the estimated location of temperatures of the gas ring.

The casing 16b is welded to the probe in a sealed manner. It comprises an abutment surface 24 which bears against the outer wall of the housing 26 and means for attachment to this wall. It also comprises openings in which portions of screened multi-core connecting tube comprising mineral insulation, respectively 14ab and 14bc are engaged, which are welded in a sealed manner to the casing 16b (welds 28).

The casing 16b is closed in a sealed manner by a cover 30 welded after the connections of the inner wires to the portions 14ab and 14bc and to the probe 10b have been welded according to the desired connections.

With reference to the thermocouple 12b of FIG. 2, it will be seen that the portion 14ab comprises only one chromel wire and one alumel wire 32 and 34 in FIGS. 3 to 5, which are welded respectively to a chromel wire 36 and an alumel wire 38 of the portion 14bc, the weld being produced inside the connecting casing.

The portion 14bc comprises four wires, firstly the wires 36 and 38 and secondly another chromel wire 40 and another alumel wire 42 which are respectively welded, inside the casing 16b, to the wires CR and AL constituting the thermocouple proper (the ends of the strands CR and AL open out inside the casing 16b).

As can be seen in FIGS. 3 to 5, the sections of the various connecting wires contained in the portions of tube 14ab and 14bc are different in order to take into account the criterion of equality of the overall resistances of the two-core cables extending from the measurement point to each thermocouple. Thus, the wires 36 and 38 which lead to the thermocouple 12a do not necessarily have the same section as the wires 32 and 34 to which they are welded, nor as the wires 40 and 42 which lead to the thermocouple 12b.

By way of example, it is possible to use the following sections for a circular set of six thermocouples distributed along the set and connected in parallel according to the scheme of FIG. 2.

For the purpose of simplification, calculations have been made at a temperature of 20° C.

The length of the portion 14ab is 56.2 cm
that of the portion 14bc is 73.5 cm
that of the portion 14cd is 60.5 cm that of the portion 14*de* is 47.5 cm that of the portion 14*ef* is 33.5 cm.

The resistivity of the chromel is 70.6 micro-ohms-cm, that of the alumel is 29.4 micro-ohms-cm.

An empirical calculation, taking into account the fact that it is preferable to use chromel wires and alumel wires whose diameters are chosen from a relatively reduced range (approximately 0.25 to 1 mm), has shown that the following sections could be chosen:

Connection to the thermocouple A
  portion AB
    1 chromel wire having a diameter of 1.02 mm
    1 alumel wire having a diameter of 1.02 mm
  portion BC
    1 chromel wire having a diameter of 0.51 mm
    1 alumel wire having a diameter of 0.51 mm
  Total resistance 4,280 ohms Connection to the thermocouple B
  portion BC
    1 Chromel wire having a diameter of 0.64 mm
    1 alumel wire having a diameter of 0.32 mm
  Total resistance 4,278 ohms Connection to thermocouple D
  portion CD
    1 chromel wire having a diameter of 0.51 mm
    1 alumel wire having a diameter of 0.32 mm
  Total resistance 4,283 ohms Connection to thermocouple E
  portion DE
    1 chromel wire having a diameter of 0.81 mm
    1 alumel wire having a diameter of 0.51 mm
  portion CD
    1 chromel wire having a diameter of 0.51 mm
    1 alumel wire having a diameter of 0.51 mm
  Total resistance 4,282 ohms Connection to the thermocouple F
  portion EF
    1 chromel wire having a diameter of 1.02 mm
    1 alumel wire having a diameter of 1.02 mm
  portion DE
    1 chromel wire having a diameter of 0.81 mm
    1 alumel wire having a diameter of 0.81 mm
  portion CD
    1 chromel wire having a diameter of 0.51 mm
    1 alumel wire having a diameter of 0.51 mm
  Total resistance 4,282 ohms.

Additional connection between the thermocouple C and the measurement point inside the measuring casing for equalizing the resistance of the connection of this last thermocouple: 1 chromel wire and 1 alumel wire of diameter 0.25 mm and length 21.7 cm; total resistance 4,280 ohms.

These results show that it is possible to choose the sections of wire in order to provide excellent equality of total connection resistances, whilst respecting certain additional constraints such as the choice of current diameters of the connecting wires.

Variations may naturally be applied to the embodiments of the invention, in particular as regards the material construction of the sets of thermocouples. In particular, it is not absolutely necessary that the sets of thermocouples are constituted by welding screened multi-core cables to connecting casings, since these cables, as well as the casings and thermocouples, may be provided with snap-in connectors, which facilitate the interchangeability of the probes.

Whilst respecting the principle of the invention, it is also possible to provide a connection of thermocouples in parallel other than by two-core cables extending from each thermocouple to a common measuring point: for example, it is possible to connect the thermocouples in pairs or in threes by chromel and alumel wires having sections calculated to equalize the resistances considered from their common point and in order to distribute these resistances on the two connecting wires. In the same manner, the groups of two or three thermocouples are interconnected with wires whose section is calculated to equilibrate and distribute the connection resistances on the two wires.

I claim:

1. A thermocouple arrangement for measuring the average temperature in a region, comprising a plurality of thermocouples at spaced apart locations within the region, each thermocouple comprising two conductors of different materials, a plurality of pairs of conductors, one pair allocated to each thermocouple, connecting said thermocouples in parallel to a common junction, the pairs of conductors being of different lengths depending on the distance of their respective thermocouples from the common junction, the material of each conductor of each pair being the same as the material of the thermocouple conductor to which it is connected, and the cross-sectional dimensions of the conductors of each pair being different from the cross-sectional dimensions of the corresponding conductors of other pairs, the cross-sectional dimensions of the conductors of each pair being related to the length of those conductors such that the electrical resistance of each pair of conductors is equal to the electrical resistance of every other pair of conductors and hence the electrical resistance between each thermocouple and the common junction is the same, and a protective tube between each two successive thermocouples accommodating said pairs of conductors, said tubes being arranged in succession and terminating at a junction box containing said common junction.

2. A thermocouple arrangement as defined in claim 1 wherein each tube contains all the pairs of conductors connected to thermocouples located beyond that tube as viewed from the junction box.

3. A thermocouple arrangement as defined in claim 2 including a connecting casing in the region of each thermocouple, said tubes being interconnected by said casings, said pairs of conductors being connected to their respective thermocouples within the respective one of said casings.

4. A thermocouple arrangement for measuring the average temperature in a region, comprising a plurality of thermocouples at spaced apart locations within the region, each thermocouple comprising two conductors of different materials, and a plurality of pairs of conductors, one pair allocated to each thermocouple, connecting said thermocouples in parallel to a common junction, the pairs of conductors being of different lengths depending on the distance of their respective thermocouples from the common junction, the material of each conductor of each pair being the same as the material of the thermocouple conductor to which it is connected, the cross-sectional dimensions of the conductors of each pair being different from the cross-sectional dimensions of the corresponding conductors of other pairs, the cross-sectional dimensions of the conductors of each pair being related to the length of those conductors such that the electrical resistance of each pair of conductors is equal to the electrical resistance of every other pair of conductors and hence the electrical resistance between each thermocouple and the common junction is the same, and the cross-sectional dimensions of the two conductors of each pair being such as to give both conductors of each pair connected to the same thermocouple linear resistance along equal lengths thereof which are in inverse ratio to the coefficients of variation of resistance with temperature of the conductors.

5. A thermocouple arrangement of measuring the average temperature in a region, comprising
   a plurality of thermocouples at spaced apart locations within the region, each thermocouple comprising two conductors of different materials, and
   a plurality of pairs of conductors, one pair allocated to each thermocouple, connecting said thermocouples in parallel to a common junction, the pairs of conductors being of different lengths depending on the distance of their respective thermocouples from the common junction, the material of each conductor of each pair being the same as the material of the thermocouple conductor to which it is connected, and the cross-sectional dimensions of the conductors of each pair being different from the cross-sectional dimensions of the corresponding conductors of other pairs, the cross-sectional dimensions of the conductors of each pair being related to the length of those conductors such that the electrical resistance of each pair of conductors is equal to the electrical resistance of every other pair of conductors and hence the electrical resistance between each thermocouple and the common junction is the same, and said pairs of conductors being part of multi-core cables comprising wires of the same materials as said thermocouples, said wires being embedded within compacted magnesia, and a metal casing containing said magnesia, said casing being resistant to high temperatures.

* * * * *